US012337863B2

(12) United States Patent
Reshef

(10) Patent No.: US 12,337,863 B2
(45) Date of Patent: Jun. 24, 2025

(54) PROCESSING ENVIRONMENTAL DATA FOR VEHICLES

(71) Applicant: GM Global Technology Operations LLC, Detroit, MI (US)

(72) Inventor: Roi Reshef, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1000 days.

(21) Appl. No.: 17/388,517

(22) Filed: Jul. 29, 2021

(65) Prior Publication Data

US 2023/0032132 A1 Feb. 2, 2023

(51) Int. Cl.
*B60W 60/00* (2020.01)
*B60W 30/165* (2020.01)

(52) U.S. Cl.
CPC ........ *B60W 60/001* (2020.02); *B60W 30/165* (2013.01); *B60W 2420/403* (2013.01); *B60W 2552/53* (2020.02); *B60W 2554/4045* (2020.02)

(58) Field of Classification Search
None
See application file for complete search history.

(56) References Cited

U.S. PATENT DOCUMENTS

| | | | |
|---|---|---|---|
| 2009/0067675 A1* | 3/2009 | Tan .................... | G01S 13/931 382/104 |
| 2021/0319261 A1* | 10/2021 | Ye ..................... | G06V 30/248 |
| 2023/0009173 A1* | 1/2023 | Reshef ............... | B60W 30/18163 |

OTHER PUBLICATIONS

He et al.; "Deep Residual Learning for Image Recognition"; Retrieved Online from arXiv:1512.03385v1 [cs.CV]; Dec. 10, 2015; 12 Pages.
Hoel et al.; "Combining Planning and Deep Reinforcement Learning in Tactical Decision Making for Autonomous Driving"; Retrieved Online from arXiv:1905.02680v1 [cs.RO]; May 6, 2019; 12 Pages.
Vaswani et al.; "Attention Is All You Need"; Retrieved Online from arXiv:1706.03762v5 [cs.CL]; Dec. 6, 2017; 15 Pages.

* cited by examiner

*Primary Examiner* — Darryl V Dottin
(74) *Attorney, Agent, or Firm* — CANTOR COLBURN LLP

(57) ABSTRACT

Examples described herein provide a computer-implemented method for processing environmental data for at least one other vehicle relative to a target vehicle. The method includes processing, by a processing device using a self-attention mechanism, first data associated the at least one other vehicle to generate a first output associated with the at least one other vehicle. The method further includes processing, by the processing device using stacked residual blocks, second data associated the target vehicle to generate a second output associated with the target vehicle. The method further includes concatenating, by the processing device, the first output and the second output to generate a concatenated vector. The method further includes making, by the processing device, a driving decision for the target vehicle based at least in part on the concatenated vector. The method further includes controlling the target vehicle based at least in part on the decision.

20 Claims, 4 Drawing Sheets

PROCESSING ENVIRONMENTAL DATA FOR VEHICLES

INTRODUCTION

The present disclosure relates to vehicles and more particularly to processing environmental data for vehicles.

Modern vehicles (e.g., a car, a motorcycle, a boat, or any other type of automobile) may be equipped with a vehicular communication system that facilitates different types of communication between the vehicle and other entities. For example, a vehicular communication system can provide for vehicle-to-infrastructure (V2I), vehicle-to-vehicle (V2V), vehicle-to-pedestrian (V2P), and/or vehicle-to-grid (V2G) communication. Collectively, these may be referred to as vehicle-to-everything (V2X) communication that enables communication of information from the vehicle to any other suitable entity. Various applications (e.g., V2X applications) can use V2X communications to send and/or receive safety messages, maintenance messages, vehicle status messages, and the like.

Modern vehicles can also include one or more cameras that provide back-up assistance, take images of the vehicle driver to determine driver drowsiness or attentiveness, provide images of the road as the vehicle is traveling for collision avoidance purposes, provide structure recognition, such as roadway signs, etc. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

Such vehicles can also be equipped with sensors such as a radar device(s), LiDAR device(s), and/or the like for performing target tracking. Target tracking includes identifying a target object and tracking the target object over time as the target object moves with respect to the vehicle observing the target object. Images from the one or more cameras of the vehicle can also be used for performing target tracking.

These communication protocols, cameras, and/or sensors can be useful for autonomous vehicles.

SUMMARY

In one exemplary embodiment, a computer-implemented method is provided for processing environmental data for at least one other vehicle relative to a target vehicle. The method includes processing, by a processing device using a self-attention mechanism, first data associated the at least one other vehicle to generate a first output associated with the at least one other vehicle. The method further includes processing, by the processing device using stacked residual blocks, second data associated the target vehicle to generate a second output associated with the target vehicle. The method further includes concatenating, by the processing device, the first output and the second output to generate a concatenated vector. The method further includes making, by the processing device, a driving decision for the target vehicle based at least in part on the concatenated vector. The method further includes controlling the target vehicle based at least in part on the driving decision.

In additional examples, wherein the first data associated with the at least one other vehicle comprises at least one of an estimated kinematic state of the at least one other vehicle, a lane assignment, and a vehicle intent.

In additional examples, wherein the first data comprises a first subset of the first data associated with a first other vehicle and a second subset of the first data associated with a second other vehicle.

In additional examples, wherein the first subset of the first data is expressed as a first one-dimensional (1D) features vector, and wherein the second subset of the first data is expressed as a second 1D features vector.

In additional examples, wherein processing the first data comprises combining the first 1D features vector and the second 1D features vector into a two-dimensional (2D) matrix.

In additional examples, wherein the 2D matrix comprises velocity data associated with the at least one other vehicle and position data associated with the at least one other vehicle.

In additional examples, wherein the second data associated with the target vehicle comprises kinematic state information and lane information.

In additional examples, wherein the kinematic state information is represented in a coordinate frame of a road upon which the target vehicle is located.

In additional examples, wherein the lane information is expressed by a vector of binary values, where a zero value represents no lane present and a one value represents a lane present.

In additional examples, wherein each of the stacked residual blocks comprises a first convolutional unit, a rectified linear unit, and a second convolutional unit.

In additional examples, wherein making the driving decision comprises determining a driving policy and a value associated with a current state of an agent in an environment.

In additional examples, wherein controlling the target vehicle based at least in part on the decision comprises controlling the target vehicle based on the driving policy and a current state of an agent in an environment.

In another exemplary embodiment a system includes a memory comprising computer readable instructions. The system further includes a processing device for executing the computer readable instructions, the computer readable instructions controlling the processing device to perform operations for processing environmental data for at least one other vehicle relative to a target vehicle. The operations include processing, using a self-attention mechanism, first data associated the at least one other vehicle to generate a first output associated with the at least one other vehicle. The operations further include processing, using stacked residual blocks, second data associated the target vehicle to generate a second output associated with the target vehicle. The operations further include concatenating the first output and the second output to generate a concatenated vector. The operations further include making a driving decision for the target vehicle based at least in part on the concatenated vector. The operations further include controlling the target vehicle based at least in part on the driving decision.

In additional examples, wherein the first data associated with the at least one other vehicle comprises at least one of an estimated kinematic state of the at least one other vehicle, a lane assignment, and a vehicle intent.

In additional examples, wherein the first data comprises a first subset of the first data associated with a first other vehicle and a second subset of the first data associated with a second other vehicle.

In additional examples, wherein the first subset of the first data is expressed as a first one-dimensional (1D) features vector, and wherein the second subset of the first data is expressed as a second 1D features vector.

In additional examples, wherein processing the first data comprises combining the first 1D features vector and the second 1D features vector into a two-dimensional (2D) matrix.

In additional examples, wherein the 2D matrix comprises velocity data associated with the at least one other vehicle and position data associated with the at least one other vehicle.

In additional examples, wherein the second data associated with the target vehicle comprises kinematic state information and lane information.

In yet another exemplary embodiment a computer program product includes a computer readable storage medium having program instructions embodied therewith, wherein the computer readable storage medium is not a transitory signal per se, the program instructions executable by a processing device to cause the processing device to perform operations for processing environmental data for at least one other vehicle relative to a target vehicle. The operations include processing, using a self-attention mechanism, first data associated the at least one other vehicle to generate a first output associated with the at least one other vehicle. The operations further include processing, using stacked residual blocks, second data associated the target vehicle to generate a second output associated with the target vehicle. The operations further include concatenating the first output and the second output to generate a concatenated vector. The operations further include making a driving decision for the target vehicle based at least in part on the concatenated vector. The operations further include controlling the target vehicle based at least in part on the driving decision.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
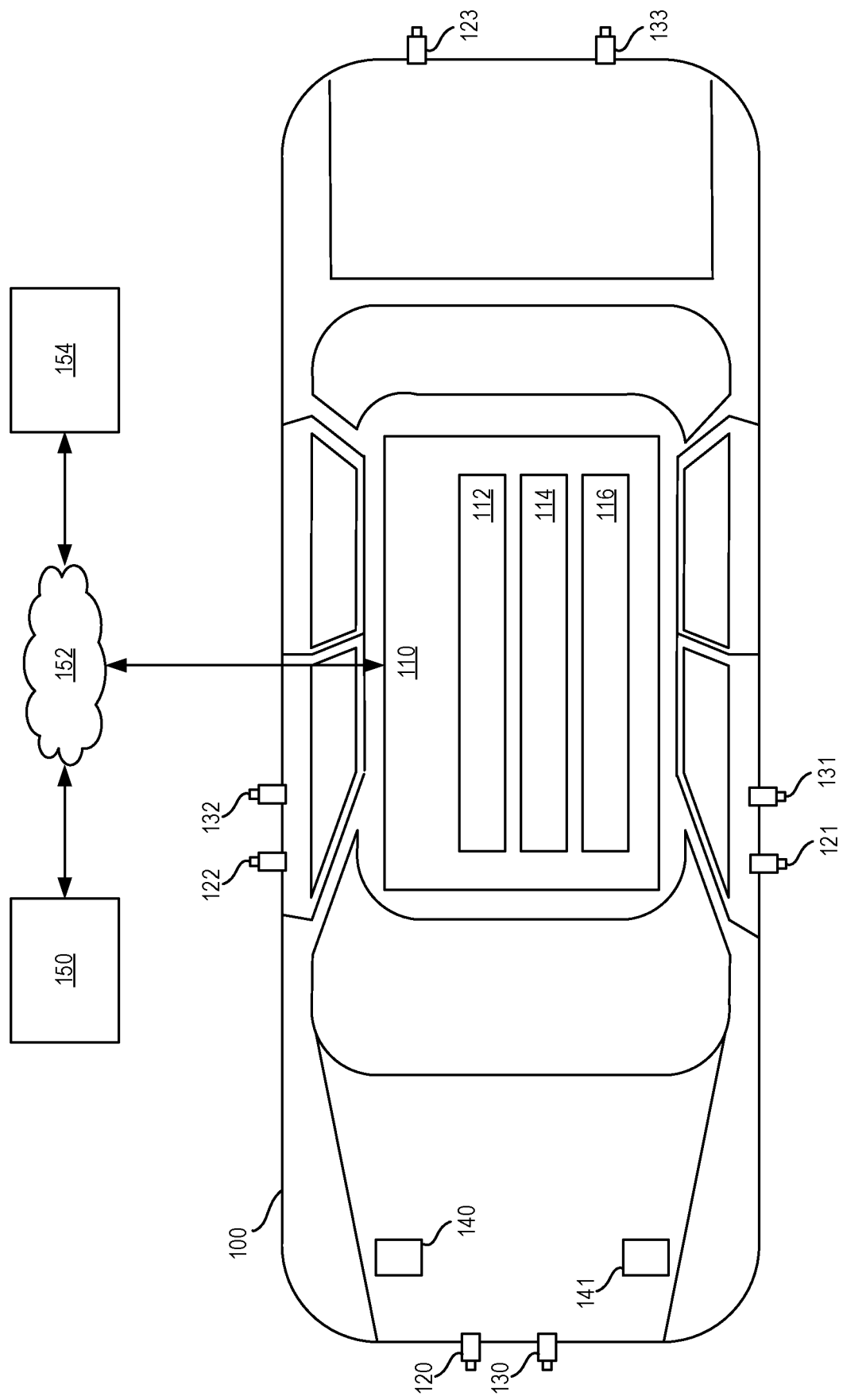
FIG. 1 depicts a vehicle including sensors and a processing system according to one or more embodiments described herein.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for processing environmental data for vehicles. More particularly, one or more embodiments described herein provide for encoding and processing environmental data (information) in learning-based autonomous vehicle (AV) driving policies using a deep attention mechanism.

AV driving policies provide for how an autonomous vehicle operates. AV driving policies encode and extract information about an autonomous vehicle's environment relative to decision making. This information is used to construct a behavioral/motion plan for the autonomous vehicle to execute. The information can be collected from the autonomous vehicle (referred to as the "target vehicle") and/or from other surrounding vehicles (which may or may not be autonomous also) (referred to as "another vehicle" or "other vehicles").

Conventional approaches to processing environmental data for vehicles are insufficient. One such approach is a method of rasterizing different environmental information in a multi-channel "birds-eye-view" image and processing it using a convolutional neural network. Although this approach can be useful for motion projection of other vehicles, it suffers from the inefficiency in rasterizing the birds-eye-view image, compared to using road-coordinate-frame projections. Another conventional approach is convolutional social pooling. In this example, kinematic information of vehicles is encoded relative to the road coordinate frame by dividing the road into grid cells to provide a lane-level lateral discretization and constant longitudinal progress cells, which each cell having a multi-channel spatial container, and the joint social tensor is fed into a sequence of convolutional layers. However, this approach is limited to simple read structures with all lanes parallel to each other due to the 2D structure of the social tensor. In yet another conventional approach, an architecture is provided in which an unordered sequence of vectors are being processed by stacking 1-sized kernel convolutions followed by a max-pool operation over the channel dimension. This approach is limited in its expressive power in capturing interactions between different actors (vehicles) and limited performance for use cases that require the extraction of multi-level interactions between input entities.

One or more embodiments described herein address these and other shortcomings of the prior art by using surrounding vehicle state encoding and a neural architecture. According to one or more embodiments described herein, a method is provided that encodes a state of a target vehicle (e.g., an autonomous vehicle) and the perceived states of other (surrounding) vehicles as well as information about the environment. The states/information is then processed using a neural architecture to generate policy and/or value outputs for learning driving policies. It should be appreciated that the techniques described herein can be used to encode the state of the target vehicle even if there are no other (surrounding) vehicles. More particularly, one or more embodiments described herein provide for encoding environmental information in an efficient and flexible way for decision making, such as in the context of autonomous vehicles. For example, state information can be encoded in cases where there is a varying number of surrounding vehicles, including no surrounding vehicles.

FIG. 1 depicts a vehicle 100 including sensors and a processing system 110 according to one or more embodiments described herein. In the example of FIG. 1, the vehicle 100 includes the processing system 110, cameras 120, 121, 122, 123, cameras 130, 131, 132, 133, a radar sensor 140, and a LiDAR sensor 141. The vehicle 100 may be a car, truck, van, bus, motorcycle, boat, plane, or another suitable vehicle 100.

The cameras 120-123 are surround view cameras that capture images external to, and in near proximity to, the vehicle 100. The images captured by the cameras 120-123 together form a surround view (sometimes referred to as a "top-down view" or a "bird's eye view") of the vehicle 100. These images can be useful for operating the vehicle (e.g., parking, backing, etc.). The cameras 130-133 are long-range cameras that capture images external to the vehicle and farther away from the vehicle 100 than the cameras 120-123. These images can be useful for object detection and avoidance, for example. It should be appreciated that, although eight cameras 120-123 and 130-133 are shown, more or fewer cameras may be implemented in various embodiments.

Captured images can be displayed on a display (not shown) to provide external views of the vehicle 100 to the driver/operator of the vehicle 100. The captured images can be displayed as live images, still images, or some combination thereof. In some examples, the images can be combined to form a composite view, such as the surround view.

The radar sensor 140 measures range to a target object by transmitting electromagnetic waves and measuring the reflected waves with a sensor. This information is useful for determining a target object's distance/location relative to the vehicle 100.

The LiDAR (light detection and ranging) sensor 141 measures distance to a target object (e.g., other vehicle 154) by illumining the target with pulsed laser light and measuring the reflected pulses with a sensor. This information is useful for determining a target object's distance/location relative to the vehicle 100.

Data generated from the cameras 120-123, 130-133, the radar sensor 140, and/or the LiDAR sensor 141 can be used to detect and/or track a target object relative to the vehicle 100. Examples of target objects include other vehicles (e.g., the other vehicle 154), vulnerable road users (VRUs) such as pedestrians, bicycles, animals, potholes, oil on a roadway surface, debris on a roadway surface, fog, flooding, and the like.

Figure 2:
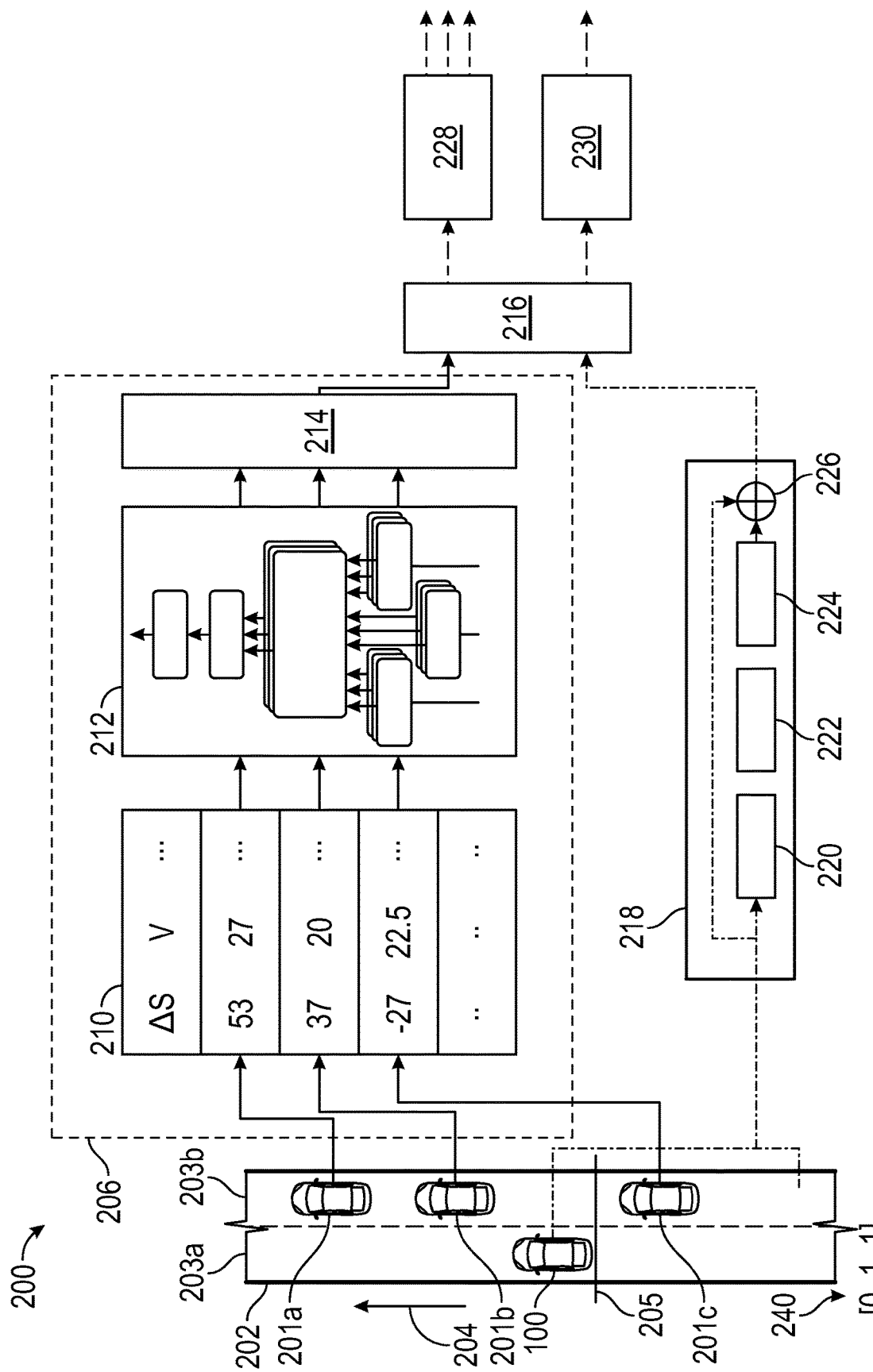
FIG. 2 depicts an architecture that supports processing environmental data for vehicles according to one or more embodiments described herein.

The processing system 110 includes a data/communication engine 112, a decision engine 114, and a control engine 116. The a data/communication engine 112 receives/collects data, such as from sensors associated with the vehicle 100 and/or receives data from other sources such as the remote processing system 150 and/or the other vehicle 154. The decision engine 114 processes the data to make a driving decision. An example of how the decision engine 114 processes the data is shown in FIG. 2 and is described further herein. The control engine 116 controls the vehicle 100, such as to execute a driving maneuver (e.g., change lanes, change velocity, etc.). Although not shown, the processing system 110 can include other components, engines, modules, etc., such as a processor (e.g., a central processing unit, a graphics processing unit, a microprocessor, etc.), a memory (e.g., a random-access memory, a read-only memory, etc.), data store (e.g., a solid state drive, a hard disk drive, etc.) and the like.

The processing system 110 can be communicatively coupled to a remote processing system 150, which can be an edge processing node as part of an edge processing environment, a cloud processing node as part of a cloud processing environment, or the like. The processing system 110 can also be communicatively coupled to one or more other vehicles (e.g., other vehicle 154). In some examples, the processing system 110 is communicatively coupled to the processing system 150 and/or the other vehicle 154 directly (e.g., using V2V communication), while in other examples, the processing system 110 is communicatively coupled to the processing system 150 and/or the other vehicle 154 indirectly, such as by a network. For example, the processing system 110 can include a network adapter (not shown) (see, e.g., the network adapter 426 of FIG. 4). The network adapter enables the processing system 110 to transmit data to and/or receive data from other sources, such as other processing systems, data repositories, and the like including the remote processing system 150 and the other vehicle 154. As an example, the processing system 110 can transmit data to and/or receive data from the remote processing system 150 directly and/or via a network 152.

The network 152 represents any one or a combination of different types of suitable communications networks such as, for example, cable networks, public networks (e.g., the Internet), private networks, wireless networks, cellular networks, or any other suitable private and/or public networks. Further, the network 152 can have any suitable communication range associated therewith and may include, for example, global networks (e.g., the Internet), metropolitan area networks (MANs), wide area networks (WANs), local area networks (LANs), or personal area networks (PANs). In addition, the network 152 can include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof. According to one or more embodiments described herein, the remote processing system 150, the other vehicle 154, and the processing system 110 communicate via a vehicle-to-infrastructure (V2I), vehicle-to-vehicle (V2V), vehicle-to-pedestrian (V2P), and/or vehicle-to-grid (V2G) communication.

The features and functionality of the components of the processing system 110 are described further herein. The processing system 110 of the vehicle 100 aids in decision making in the context of autonomous vehicle operation.

FIG. 2 depicts an architecture 200 that supports processing environmental data for vehicles according to one or more embodiments described herein. In this example, the architecture 200 includes the vehicle 100, a vehicle 201a, a vehicle 201b, and a vehicle 201c. The vehicles 201a, 201b, 201c are examples of the other vehicle 154 of FIG. 1 and are collectively referred to as "vehicles 201." It should be appreciated one or more of the vehicles 201 can be configured similarly to the vehicle 100 as shown in FIG. 1 and as described herein.

As shown in the example of FIG. 2, the vehicle 100 and the vehicles 201 are traveling along a road 202 having lanes 203a, 203b in a direction 204. Particularly, the vehicle 100 is traveling in the direction 204 in the lane 203a, and the vehicles 201 are traveling in the direction 204 in the lane 203b. It should be appreciated that the particular arrangement of vehicles 100, 201 and the road 202 in FIG. 2 are merely an example; other arrangements are also possible. The techniques described herein can be used in many different use cases, for example: using lane-wise directionality (rather than road-wise) to represent vehicles 201 coordinates; projection of the position of the vehicle 100 onto the lane of the vehicles 201; normalization quantities relative to the projection of the vehicle 100 (e.g., by subtracting longitudinal positions to determine longitudinal differences to the vehicle 100), etc.

Each of the vehicles 100, 201 collects data about itself and transmits it to a processing system for processing. According to an example, the vehicles 201 collect data about themselves and transmit the data to the processing system 110 of the vehicle 100 for processing. According to another example, the vehicles 100, 201 collect data about themselves and transmit the data to the remote processing system 150.

The data (i.e., information) provided by the vehicles 201 can indicate perception of the vehicles in the environment and may yield estimated kinematic states of the vehicles 201, lane assignments, a vehicle's intent (e.g., a direction of travel, an intention to merge/change lanes, etc.), and/or any other information useful for decision making. At block 206, the data about the vehicles 201 is processed. The information from the vehicles 201 can take the form of a one-dimensional (1D) features vector. The 1D features vectors from the vehicles 201 can be combined (or concatenated) into a two-dimensional (2D) matrix (e.g., vehicles×features) whose order along the vehicles dimension is arbitrary, for example. A state table 210 shows an example of such a 2D matrix. Particularly, the data received from the vehicles 201 can be stored as state vectors in the state table 210. In this example, the state table 210 includes data for the vehicle 201a in the first row, data for the vehicle 201b in the second row, and data for the vehicle 201c in the third row. Data for other vehicles can also be stored in the state table 210. The state table 210, for each row, includes data for the respective vehicle's position ($\Delta s$), the vehicles velocity (v), and any other suitable information (e.g., assignment to a lane, acceleration, orientation of the vehicle relative to its lane, curvature of the lane, etc.). For example, regarding lane assignment, vehicles traveling on the same lane as the vehicle 100 can have a value of "0" while the vehicles on the right adjacent lane can have a value of "−1" and the vehicles on the left adjacent lane can have a value of "+1." This approach can be used in non-parallel lane configurations as well, having any other value, so eventually any lane can have a different value to indicate vehicles assigned to it regardless of spatial relations between lanes. It should be appreciated that the vehicle's position is determined based on the vehicle's current location relative to a location s=0. For example, the location s=0 is shown in FIG. 2 as line 205, and the value for the position of each of the vehicles 201 is determined relative to that location. In this way, the values stored in the state vector table 210 for the vehicles 201 are normalized to the vehicle 100. Thus, in this example, as shown in the state table 210, the position value $\Delta s$ for the vehicle 201a is 53, the position value $\Delta s$ for the vehicle 201b is 37, and the position value $\Delta s$ for the vehicle 201c is −27. The state table 210 also includes the velocity of the vehicles 201a, 201b, 201c as 27, 20, and 22.5 respectively.

To learn meaningful information about the interactions between and among the vehicles 100, 201, the vehicles matrix (e.g., the state table 210) is processed at block 212. Particularly, the block 212 is a self-attention mechanism that processes the vehicles matrix by stacking N multi-head self-attention blocks, which are invariant to the order of entities (vehicle vectors) in the matrix. Any of the neural network layers of the block 212 can be a projection of inputs to outputs that is learned to be optimal for a given task (e.g., decision making). Stacking these layers increases the expressive power of the neural network formed by these layers. The attention mechanism has several layers and mathematical operations between them as follows: it learns a projection Q of input vector into a query vector; it learns a projection K of input vector into a key vector; and it learns a projection V of input vector into a value vector. These three projections (Q, K, and V) can feature vectors of any of the input entities (e.g., vehicle 201 feature vectors) with the three resulting vectors being determined per entity (e.g., per vehicle 201a, 201b, 201c). Then, for each entity, the query vectors are matched with other entities' key vectors (to account for similarities or distance between entities), which results with a similarity score. The similarity score to for the other entities is multiplied with its vector value, and the resulting vectors are summed (e.g., a weighted sum of the value vectors of the other entities weighted by the similarity scores). This produces an output of a single 1D vector for each entity that accounts for pairwise interactions with the other entities. Stacking multiple attention mechanisms sequentially has the power to account for multi-level interactions between entities.

Attention outputs from the block 212 are input into a max-pool block 214, which performs a max-pool operation that runs over the features dimensions and aggregates specific feature information from the vehicles 201. The max-pool operation gets the maximum value for each column from the state table 210. This generates a first output associated with the vehicles 201, which is referred to as a global embedding vector, that can be further used with other operations as further described herein and is input into the block 216. Continuing from above, the stacking of multiple self-attention mechanisms (e.g., block 212) results with the same data structure as the input, namely a 2D unordered matrix, just that now each entity's vector does not just contain its own features but also contains information about the interactions of this entity with the other entities. In a sense, each vector represents the state of a vehicle with respect to the rest of the environment. This is a "per-vehicle embedding vector," in which values are latent (e.g., their structure is learned, not defined by the user). Similarly to the approach described herein, the per-vehicles embedding vectors are being aggregated into a single fixed-size vector using a max-pool operator at the max-pool block 214 over the features dimension (alternatively, can be average-pool or any other aggregation operator). This is a 1D vector that represents the relevant information about the vehicles 201 and their interactions with each other. Since this portion of the architecture 200 (e.g., the block 210, 212, 214) is invariant to the order of information of vehicles fed into it, encoding information about the environment with non-trivial spatial order (e.g., like in-lane merges and lane splits) is relatively straight forward.

Data (i.e., information) about the vehicle 100 is processed at the block 218. The processing at block 218 can be done before, during (e.g., simultaneous to, concurrent to, etc.), and/or after the processing at block 206. Particularly, data about the vehicle 100 (also referred to as a "target vehicle") can include kinematic state information that is represented in a coordinate frame of the road 202 (e.g., longitudinal and lateral positions and their derivatives). The data about the vehicle 100 can also include lane information for the vehicle 100. As an example, adjacent lane information can be denoted by a vector with binary values, where zero (0) represents no lane present and one (1) represents a lane present. For example, the vector 240 shown in FIG. 2 denotes that no lane is present to the left of the vehicle 100, a lane is present where the vehicle 100 is located currently, and a lane is present to the right of the vehicle 100. Additional information about environmental attributes or goals of the vehicle 100 can be concatenated, such as:

encodings of the goal lane (e.g., the lane 203b) relative to a current lane assignment (e.g., the lane 203a) in the case of a desired lane change/merge maneuver, existence of adjacent lanes, connectivity between adjacent lanes (ability to change lanes), road length, and more.

Information from the vehicle 100 is fed into M stacked residual blocks, which are represented by the block 218. The block 218 can include a first convolutional unit 220, a rectified linear unit (ReLU) 222, a second convolutional unit 224, and a skip connection 226 that sums the output of block 218 with its inputs in a way that provides for the information to "skip" block 218 if its outputs are all zeros (then inputs=outputs). This mechanism increases the robustness of the network training process. The block 218 processes the information from the vehicle 100 by performing a first convolutional operation using the first convolutional unit 220, performing an activation operation to transform the results of the first convolutional operation using the ReLU 222, and performing a second convolutional operation on the results of the activation operation using the second convolutional unit 224. The first and second convolutional units 220, 224 learn optimal weights for a weighted-sum kernel operation over inputs. The ReLU 222 uses an activation function that takes any input "x" independently and outputs y=f(x) for it, where the function "f" can be any non-linear mathematical operation, such as ReLU, LeakyReLU, Tanh, Sigmoid, etc. At block 226, the original data from the vehicle 100 and the results of the second convolutional operation can be combined. The output of the block 218 (e.g., a second output associated with the vehicle 100) is fed into the block 216.

The first output (from the block 206) associated with the vehicles 201 and the second output (from the block 218) associated with the vehicle 100 are input into the block 216, which combines or concatenates the two outputs as a concatenated vector. In case the decision making task is learned through the Actor-Critic paradigm (a Reinforcement Learning technique), the concatenated vector is fed into blocks 228, 230, which are fully connected layers and are responsible for making a decision about the operation of the vehicle 100. The block 228, also referred to as "actor head," outputs scores (or a distribution) over the actions available to the policy ("policy outputs"), and the block 230, also referred to as "critic head," determines a value associated with the current state of the agent in the environment ("value output"). According to one or more embodiments described herein, each of the blocks 228, 230 can contain fully connected layers, convolutional layers, and/or residual blocks.

Figure 3:
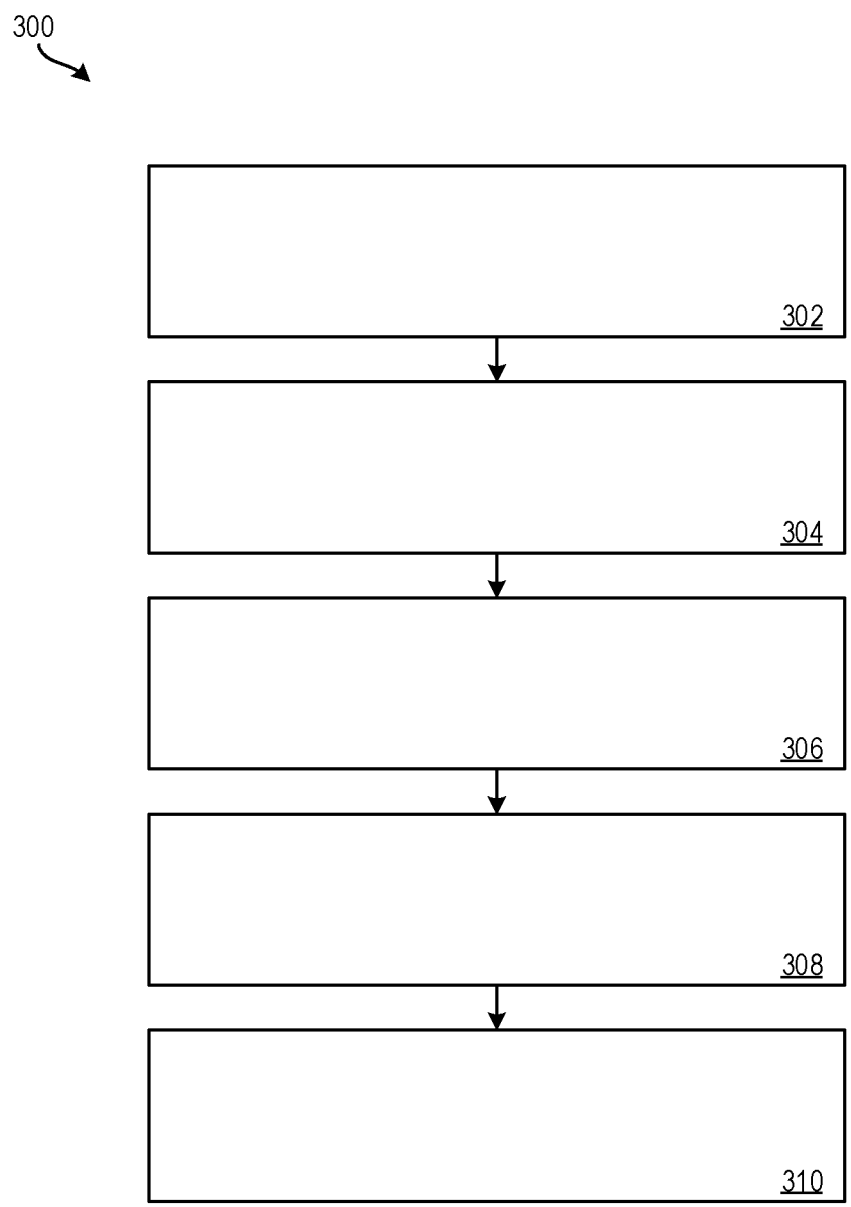
FIG. 3 depicts a flow diagram of a method for processing environmental data for vehicles according to one or more embodiments described herein.

FIG. 3 depicts a flow diagram of a method 300 for processing environmental data for vehicles according to one or more embodiments described herein. The method 300 can be performed by any suitable system or device such as the processing system 110 of FIG. 1, the processing system 400 of FIG. 4, or any other suitable processing system and/or processing device (e.g., a processor). The method 300 is now described with reference to the elements of FIGS. 1 and/or 2 but is not so limited.

At block 302, the processing system 110 processes, using a self-attention mechanism (e.g., see FIG. 2, block 206), first data associated the at least one other vehicle to generate a first output associated with the at least one other vehicle. For example, the processing system 110 (or another suitable processing system) receives data from the vehicles 201a, 201b, 201c and processes it as described herein. This can include, for example, receiving the data as a 1D features vectors from the vehicles 201, combining the data into a 2D matrix (e.g., the state table 210), using one or more self-attention blocks to process the data, and using a max-pool operation to determine the maximum value for each column from the 2D matrix.

At block 304, the processing system 110 processes, using stacked residual blocks, second data associated with the target vehicle and the static part of its environment (e.g., adjacent lanes, etc.) to generate a second output associated with the target vehicle. For example, the processing system 110 (or another suitable processing system) receives (or collects) data about the vehicle 100 and processes the data with stacked residual blocks (e.g., see FIG. 2, block 218). The processing can include performing a first convolutional operation using the first convolutional unit 220, performing an activation operation to transform the results of the first convolutional operation using the ReLU 222, and performing a second convolutional operation on the results of the activation operation using the second convolutional unit 224.

According to one or more embodiments, the blocks 302 and 304 can run simultaneously, concurrently, sequentially, or in any other suitable order.

At block 306, the processing system 110 concatenates the first output and the second output to generate a concatenated vector. The first output (from the block 206) associated with the vehicles 201 and the second output (from the block 218) associated with the vehicle 100 are input into the block 216, which combines or concatenates the two outputs as a concatenated vector.

At block 308, the processing system 110 makes a driving decision for the target vehicle based at least in part on the concatenated vector. For example, the concatenated vector is fed into block 228, 230, which are fully connected layers and are responsible for making a decision about the operation of the vehicle 100. The driving decision can include a driving policy and a value associated with the agent's state in the environment. For example, the block 228 determines a driving policy (e.g., to change lanes), and the block 230 determines a "state value." In an "Actor-Critic" paradigm (e.g., a private case of RL algorithms, which is the reason for the two blocks 228, 230) the "value output" of block 230 is mainly (although not necessarily) used for training purposes and is mainly ignored at inference (while driving), while the "policy output" of 228 has scores for some or all available actions so that the autonomous agent can select the maximal-score action for execution at inference.

At block 310, the processing system 110 controls the target vehicle based at least in part on the decision. Controlling the target vehicle can include implementing the driving policy. For example, if the driving policy is to merge lanes from the lane 203a to the lane 203b and the value associated with the driving policy is to increase velocity by 5 miles/hour, the processing system 110 can cause the vehicle 100 to increase velocity and steer towards the lane 203b. This improves vehicle operation by providing for the vehicle 100 to implement driving decisions based on its own data and based on data (e.g., kinematic data) of other vehicles (e.g., the vehicles 201a, 201b, 201c). This causes the vehicle 100 to operate more efficiently (e.g., the vehicle 100 can achieve its goals, such as driving to a particular location, more efficiently by having a better since of the behavior of the vehicles 201). The vehicle 100 can also, as a result of the present techniques, operate more autonomously (e.g., require less driver input/takeover) because it is able to extract the essence required for driving decisions more efficiently from the available input.

Additional processes also may be included, and it should be understood that the process depicted in FIG. 3 represents an illustration and that other processes may be added or existing processes may be removed, modified, or rearranged without departing from the scope and spirit of the present disclosure.

Figure 4:
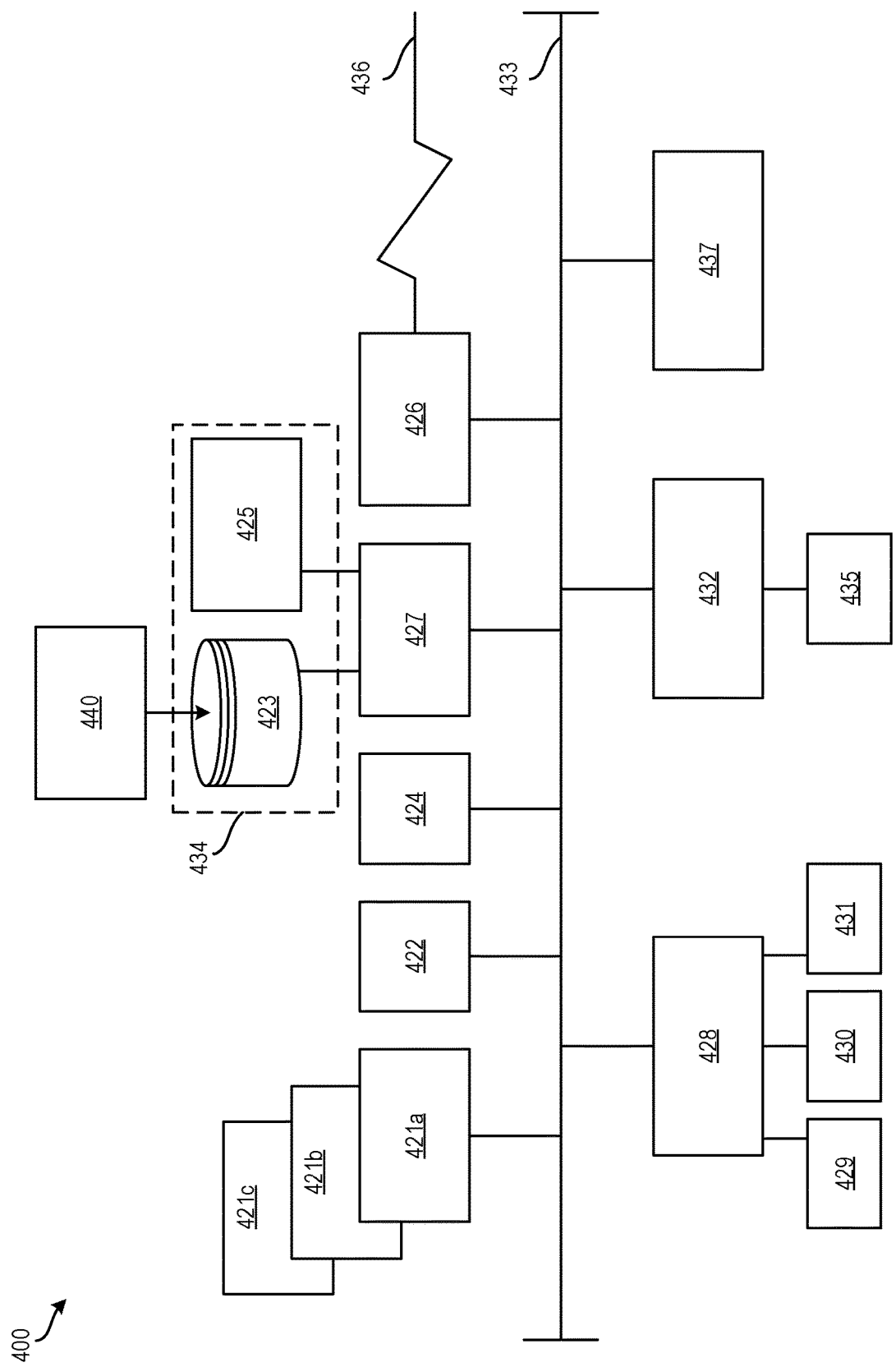
FIG. 4 depicts a block diagram of a processing system for implementing the techniques described herein according to an exemplary embodiment.

It is understood that the present disclosure is capable of being implemented in conjunction with any other type of computing environment now known or later developed. For example, FIG. 4 depicts a block diagram of a processing system 400 for implementing the techniques described herein. In examples, processing system 400 has one or more central processing units (processors) 421a, 421b, 421c, etc. (collectively or generically referred to as processor(s) 421 and/or as processing device(s)). In aspects of the present disclosure, each processor 421 can include a reduced instruction set computer (RISC) microprocessor. Processors 421 are coupled to system memory (e.g., random access memory (RAM) 424) and various other components via a system bus 433. Read only memory (ROM) 422 is coupled to system bus 433 and may include a basic input/output system (BIOS), which controls certain basic functions of processing system 400.

Further depicted are an input/output (I/O) adapter 427 and a network adapter 426 coupled to system bus 433. I/O adapter 427 may be a small computer system interface (SCSI) adapter that communicates with a hard disk 423 and/or a storage device 425 or any other similar component. I/O adapter 427, hard disk 423, and storage device 425 are collectively referred to herein as mass storage 434. Operating system 440 for execution on processing system 400 may be stored in mass storage 434. The network adapter 426 interconnects system bus 433 with an outside network 436 enabling processing system 400 to communicate with other such systems.

A display (e.g., a display monitor) 435 is connected to system bus 433 by display adapter 432, which may include a graphics adapter to improve the performance of graphics intensive applications and a video controller. In one aspect of the present disclosure, adapters 426, 427, and/or 432 may be connected to one or more I/O busses that are connected to system bus 433 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 433 via user interface adapter 428 and display adapter 432. A keyboard 429, mouse 430, and speaker 431 (or other suitable input and/or output, such as a touch screen of an infotainment system) may be interconnected to system bus 433 via user interface adapter 428, which may include, for example, a Super I/O chip integrating multiple device adapters into a single integrated circuit. One or more of the cameras 120-123, 130-133 are also connected to the system bus 433.

In some aspects of the present disclosure, processing system 400 includes a graphics processing unit 437. Graphics processing unit 437 is a specialized electronic circuit designed to manipulate and alter memory to accelerate the creation of images in a frame buffer intended for output to a display. In general, graphics processing unit 437 is very efficient at manipulating computer graphics and image processing, and has a highly parallel structure that makes it more effective than general-purpose CPUs for algorithms where processing of large blocks of data is done in parallel.

Thus, as configured herein, processing system 400 includes processing capability in the form of processors 421, storage capability including system memory (e.g., RAM 424), and mass storage 434, input means such as keyboard 429 and mouse 430, and output capability including speaker 431 and display 435. In some aspects of the present disclosure, a portion of system memory (e.g., RAM 424) and mass storage 434 collectively store the operating system 440 to coordinate the functions of the various components shown in processing system 400.

The descriptions of the various examples of the present disclosure have been presented for purposes of illustration but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for processing environmental data for at least one other vehicle relative to a target vehicle, the method comprising:
processing, by a processing device using a self-attention mechanism, first data associated with the at least one other vehicle to generate a first output associated with the at least one other vehicle;
processing, by the processing device using stacked residual blocks, second data associated with the target vehicle to generate a second output associated with the target vehicle;
concatenating, by the processing device, the first output and the second output to generate a concatenated vector;
making, by the processing device, a driving decision for the target vehicle based at least in part on the concatenated vector; and
controlling the target vehicle based at least in part on the driving decision,
wherein the first data comprises a first subset of the first data associated with a first other vehicle and a second subset of the first data associated with a second other vehicle,
wherein the first subset of the first data is expressed as a first one-dimensional (1D) features vector, and wherein the second subset of the first data is expressed as a second 1D features vector,
wherein processing the first data comprises combining the first 1D features vector and the second 1D features vector into a two-dimensional (2D) matrix, and
wherein the 2D matrix comprises velocity data associated with the at least one other vehicle and position data associated with the at least one other vehicle.

2. The computer-implemented method of claim 1, wherein the first data associated with the at least one other vehicle comprises at least one of an estimated kinematic state of the at least one other vehicle, a lane assignment, and a vehicle intent.

3. The computer-implemented method of claim 1, wherein the second data associated with the target vehicle comprises kinematic state information and lane information.

4. The computer-implemented method of claim 3, wherein the kinematic state information is represented in a coordinate frame of a road upon which the target vehicle is located.

5. The computer-implemented method of claim 3, wherein the lane information is expressed by a vector of binary values, where a zero value represents no lane present and a one value represents a lane present.

6. The computer-implemented method of claim 1, wherein each of the stacked residual blocks comprises a first convolutional unit, a rectified linear unit, and a second convolutional unit.

7. The computer-implemented method of claim 1, wherein making the driving decision comprises determining a driving policy and a value associated with a current state of an agent in an environment.

8. The computer-implemented method of claim 7, wherein controlling the target vehicle based at least in part on the decision comprises controlling the target vehicle based on the driving policy and a current state of an agent in an environment.

9. A system comprising:
a memory comprising computer readable instructions; and
a processing device for executing the computer readable instructions, the computer readable instructions controlling the processing device to perform operations for processing environmental data for at least one other vehicle relative to a target vehicle, the operations comprising:
processing, using a self-attention mechanism, first data associated with the at least one other vehicle to generate a first output associated with the at least one other vehicle;
processing, using stacked residual blocks, second data associated with the target vehicle to generate a second output associated with the target vehicle;
concatenating the first output and the second output to generate a concatenated vector;
making a driving decision for the target vehicle based at least in part on the concatenated vector; and
controlling the target vehicle based at least in part on the driving decision,
wherein the first data comprises a first subset of the first data associated with a first other vehicle and a second subset of the first data associated with a second other vehicle,
wherein the first subset of the first data is expressed as a first one-dimensional (1D) features vector, and wherein the second subset of the first data is expressed as a second 1D features vector,
wherein processing the first data comprises combining the first 1D features vector and the second 1D features vector into a two-dimensional (2D) matrix, and
wherein the 2D matrix comprises velocity data associated with the at least one other vehicle and position data associated with the at least one other vehicle.

10. The system of claim 9, wherein the first data associated with the at least one other vehicle comprises at least one of an estimated kinematic state of the at least one other vehicle, a lane assignment, and a vehicle intent.

11. The system of claim 9, wherein the second data associated with the target vehicle comprises kinematic state information and lane information.

12. A computer program product comprising a non-transitory computer readable storage medium having program instructions embodied therewith, the program instructions executable by a processor to cause the processor to perform operations for processing environmental data for at least one other vehicle relative to a target vehicle, the operations comprising:
processing, using a self-attention mechanism, first data associated with the at least one other vehicle to generate a first output associated with the at least one other vehicle;
processing, using stacked residual blocks, second data associated with the target vehicle to generate a second output associated with the target vehicle;
concatenating the first output and the second output to generate a concatenated vector;
making a driving decision for the target vehicle based at least in part on the concatenated vector; and
controlling the target vehicle based at least in part on the driving decision,
wherein the first data comprises a first subset of the first data associated with a first other vehicle and a second subset of the first data associated with a second other vehicle,
wherein the first subset of the first data is expressed as a first one-dimensional (1D) features vector, and wherein the second subset of the first data is expressed as a second 1D features vector,
wherein processing the first data comprises combining the first 1D features vector and the second 1D features vector into a two-dimensional (2D) matrix, and
wherein the 2D matrix comprises velocity data associated with the at least one other vehicle and position data associated with the at least one other vehicle.

13. The computer-implemented method of claim 1, wherein first data associated with the at least one other vehicle is received from the at least one other vehicle.

14. The computer-implemented method of claim 1, wherein the first data is received from the at least one other vehicle using vehicle-to-vehicle communication.

15. The computer-implemented method of claim 1, wherein processing the second data comprises performing a first convolutional operation, performing an activation operation to transform results of the first convolutional operation, and performing a second convolutional operation on results of the activation operation.

16. The computer-implemented method of claim 1, wherein the driving decision made using a driving policy and a state value.

17. The system of claim 9, wherein first data associated with the at least one other vehicle is received from the at least one other vehicle.

18. The system of claim 9, wherein the first data is received from the at least one other vehicle using vehicle-to-vehicle communication.

19. The system of claim 9, wherein processing the second data comprises performing a first convolutional operation, performing an activation operation to transform results of the first convolutional operation, and performing a second convolutional operation on results of the activation operation.

20. The system of claim 9, wherein the driving decision made using a driving policy and a state value.

* * * * *